(12) United States Patent
Jotwani

(10) Patent No.: US 11,763,525 B1
(45) Date of Patent: Sep. 19, 2023

(54) BLIND OBJECT TRACKING USING POINT CLOUDS

(71) Applicant: Apple Inc., Cupertino, CA (US)

(72) Inventor: Payal Jotwani, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/158,219

(22) Filed: Jan. 26, 2021

Related U.S. Application Data

(60) Provisional application No. 62/982,344, filed on Feb. 27, 2020.

(51) Int. Cl.
*G06T 17/20* (2006.01)
*G06V 10/75* (2022.01)
*G06F 18/23* (2023.01)
*G06T 19/00* (2011.01)

(52) U.S. Cl.
CPC ............ *G06T 17/205* (2013.01); *G06F 18/23* (2023.01); *G06V 10/751* (2022.01); *G06T 19/006* (2013.01)

(58) Field of Classification Search
CPC ... G06T 17/205; G06T 19/006; G06V 10/751; G06K 9/6218
See application file for complete search history.

(56) References Cited

U.S. PATENT DOCUMENTS

| | | | | |
|---|---|---|---|---|
| 8,886,387 B1* | 11/2014 | Agarwal | ................ | G06V 20/56 |
| | | | | 701/28 |
| 10,600,192 B1* | 3/2020 | McKennoch | ........... | G06T 7/292 |
| 10,650,278 B1* | 5/2020 | Ho | ........................ | G06V 10/774 |
| 2013/0293539 A1* | 11/2013 | Hunt | ...................... | G01B 11/00 |
| | | | | 345/420 |
| 2014/0225919 A1* | 8/2014 | Kaino | .................... | G06T 19/006 |
| | | | | 345/633 |
| 2015/0062120 A1* | 3/2015 | Reisner-Kollmann | ....................... | |
| | | | | G06T 19/006 |
| | | | | 345/419 |
| 2018/0286081 A1* | 10/2018 | Koperski | ................ | G06T 7/292 |
| 2021/0097701 A1* | 4/2021 | McKennoch | ............. | G06T 7/80 |

* cited by examiner

*Primary Examiner* — Phuc N Doan
(74) *Attorney, Agent, or Firm* — Fernando & Partners, LLP

(57) ABSTRACT

In one implementation, a method of blind object tracking is performed at a device including one or more processors and non-transitory memory. The method includes obtaining a first three-dimensional scene model of a physical environment during a first time period including a first plurality of points, wherein each of the first plurality of points is associated with a set of coordinates in a three-dimensional space, wherein a subset of the first plurality of points is associated with a particular cluster identifier. The method includes obtaining a second three-dimensional scene model of the physical environment during a second time period subsequent to the first time period including a second plurality of points, wherein each of the second plurality of points is associated with a set of coordinates the three-dimensional space. The method includes associating a subset of the second plurality of points with the particular cluster identifier, wherein the subset of the second plurality of points includes points with different sets of coordinates in the three-dimensional space than the points of the subset of the first plurality of points.

19 Claims, 14 Drawing Sheets

1200

| Obtaining a first three-dimensional scene model of a physical environment during a first time period including a first plurality of points, wherein each of the first plurality of points is associated with a set of coordinate in a three-dimensional space, wherein a subset of the first plurality of points is associated with a particular cluster identifier | ⟵ 1210 |

↓

| Obtaining a second three-dimensional scene model of the physical environment during a second time period subsequent to the first time period including a second plurality of points, wherein each of the second plurality of points is associated with a set of coordinate in the three-dimensional space | ⟵ 1220 |

↓

| Associating a subset of the second plurality of points with the particular cluster identifier, wherein the subset of the second plurality of points includes points with different sets of coordinates in the three-dimensional space than the points of the subset of the first plurality of points | ⟵ 1230 |

Figure 12

BLIND OBJECT TRACKING USING POINT CLOUDS

CROSS-REFERENCE TO RELATED APPLICATIONS

This application claims priority to U.S. Provisional Patent App. No. 62/982,344, filed on Feb. 27, 2020, and hereby incorporated by reference herein in its entirety.

TECHNICAL FIELD

The present disclosure generally relates to object tracking and, in particular, to systems, methods, and devices for blind object tracking using point clouds.

BACKGROUND

A point cloud includes a set of points in a three-dimensional space. In various implementations, each point in the point cloud corresponds to a surface of an object in a physical environment. Point clouds can be used to represent a physical environment in various computer vision and/or extended reality (XR) applications.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 12 is a flowchart representation of a method of blind object tracking in accordance with some implementations.

Figure 1:
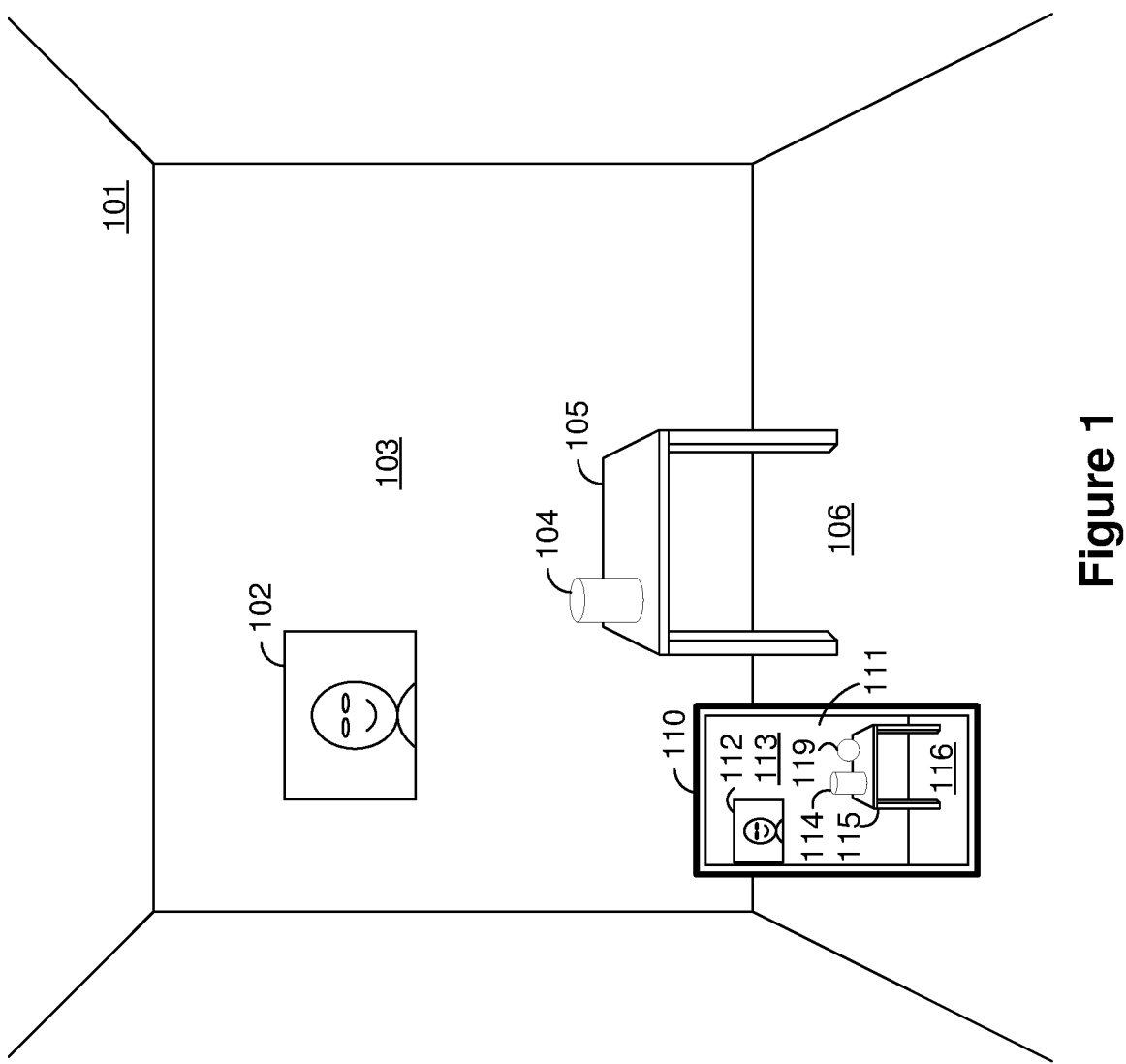
FIG. 1 illustrates a physical environment during a first time period with a handheld electronic device surveying the physical environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for blind object tracking. In various implementations, a method is performed at a device including one or more processors and non-transitory memory. The method includes obtaining a first three-dimensional scene model of a physical environment during a first time period including a first plurality of points, wherein each of the first plurality of points is associated with a set of coordinates in a three-dimensional space, wherein a subset of the first plurality of points is associated with a particular cluster identifier. The method includes obtaining a second three-dimensional scene model of the physical environment during a second time period subsequent to the first time period including a second plurality of points, wherein each of the second plurality of points is associated with a set of coordinates the three-dimensional space. The method includes associating a subset of the second plurality of points with the particular cluster identifier, wherein the subset of the second plurality of points includes points with different sets of coordinates in the three-dimensional space than the points of the subset of the first plurality of points.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a physical environment is represented by a point cloud. The point cloud includes a plurality of points, each of the plurality of points associated with at least a set of coordinates in the three-dimensional space and corresponding to a surface of an object in the physical environment. In various implementations, each of the plurality of points is further associated with other data representative of the surface of the object in the physical environment, such as RGB data representative of the color of the surface of the object. In various implementations, at least one of the plurality of points is further associated with a semantic label that represents an object type or identity of the surface of the object. For example, the semantic label may be "tabletop" or "table" or "wall". In various implementations, at least one of the plurality of points is further associated with a spatial relationship vector that characterizes the spatial relationship between a cluster including the point and one or more other clusters of points.

It may be advantageous to track the location of an object in a physical environment over time as the object moves within the physical environment. However, in various implementations, this requires that the object be kept in view while the object moves. As described herein, the location or identity of an object in a physical environment can be determined without continuous monitoring of the physical environment or the object in the physical environment.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 illustrates a physical environment 101 during a first time period with a handheld electronic device 110 surveying the physical environment 101. The physical environment 101 includes a picture 102 hanging on a wall 103, a table 105 on the floor 106, and a cylinder 104 on the table 105.

The handheld electronic device 110 displays, on a display, a representation of the physical environment 111 including a representation of the picture 112 hanging on a representation of the wall 113, a representation of the table 115 on a representation of the floor 116, and a representation of the cylinder 114 on the representation of the table 115. In various implementations, the representation of the physical environment 111 is generated based on an image of the physical environment captured with a scene camera of the handheld electronic device 110 having a field-of-view directed toward the physical environment 101.

In addition to the representations of real objects of the physical environment 101, the representation of the physical environment 111 includes a virtual object 119 displayed on the representation of the table 115.

In various implementations, the handheld electronic device 110 includes a single scene camera (or single rear-facing camera disposed on an opposite side of the handheld electronic device 110 as the display). In various implementations, the handheld electronic device 110 includes at least two scene cameras (or at least two rear-facing cameras disposed on an opposite side of the handheld electronic device 110 as the display).

Figure 2A:
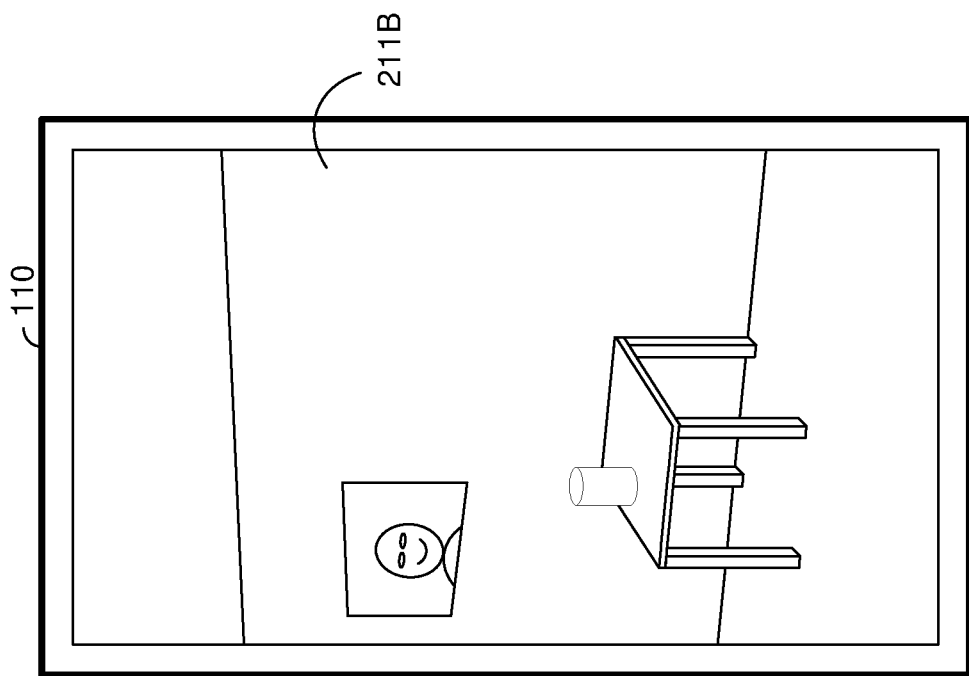
FIGS. 2A and 2B illustrate the handheld electronic device of FIG. 1 displaying two images of the physical environment during the first time period captured from different perspectives.
Figure 2B:
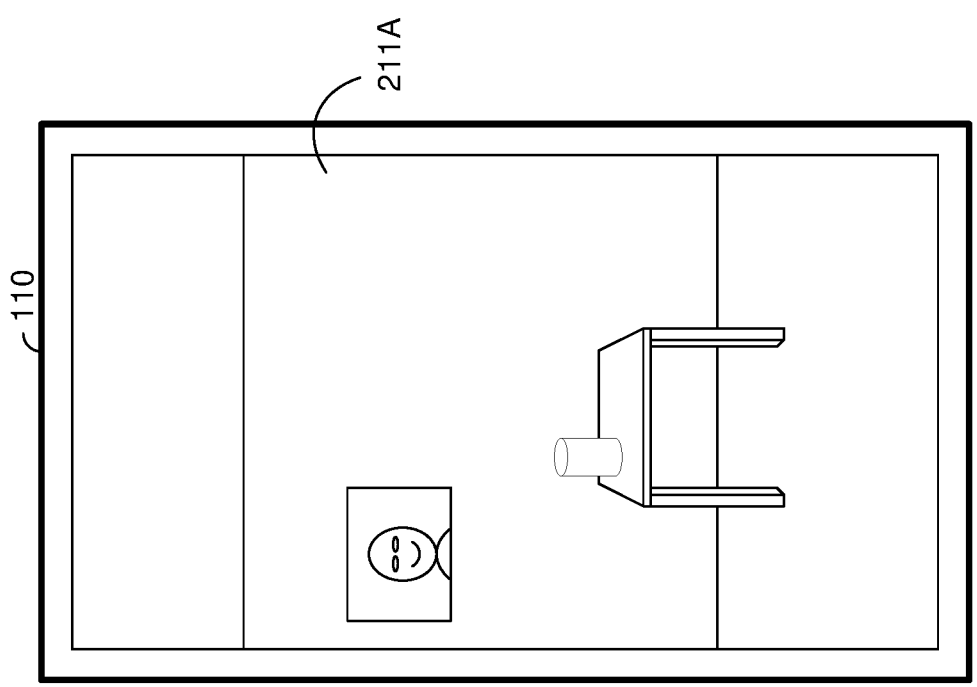

FIG. 2A illustrates the handheld electronic device 110 displaying a first image 211A of the physical environment 101 during the first time period captured from a first perspective. FIG. 2B illustrates the handheld electronic device 110 displaying a second image 211B of the physical environment 101 during the first time period captured from a second perspective different from the first perspective.

In various implementations, the first image 211A and the second image 211B are captured by the same camera at different times within the first time period (e.g., by the same single scene camera at two different times when the handheld electronic device 110 is moved between the two different times). In various implementations, the first image 211A and the second image 211B are captured by different cameras at the same time (e.g., by two scene cameras) within the first time period.

Using a plurality of images of the physical environment 101 during the first time period captured from a plurality of different perspectives, such as the first image 211A and the second image 211B, the handheld electronic device 110 generates a first point cloud of the physical environment 101.

Figure 3B:
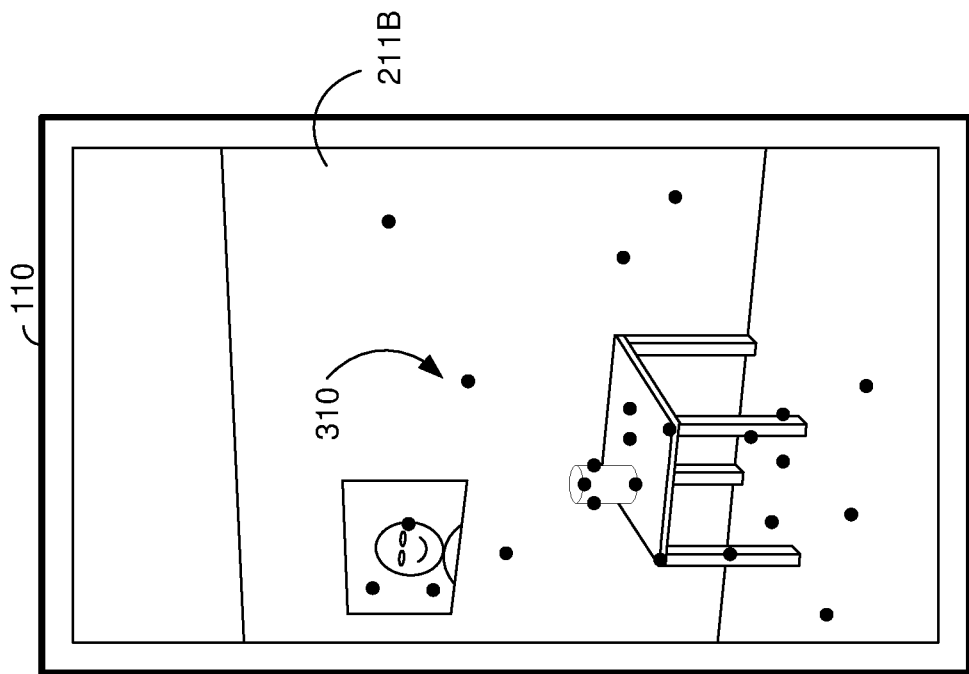
FIGS. 3A and 3B illustrate the handheld electronic device of FIG. 1 displaying the two images overlaid with a representation of a first point cloud.
Figure 3A:
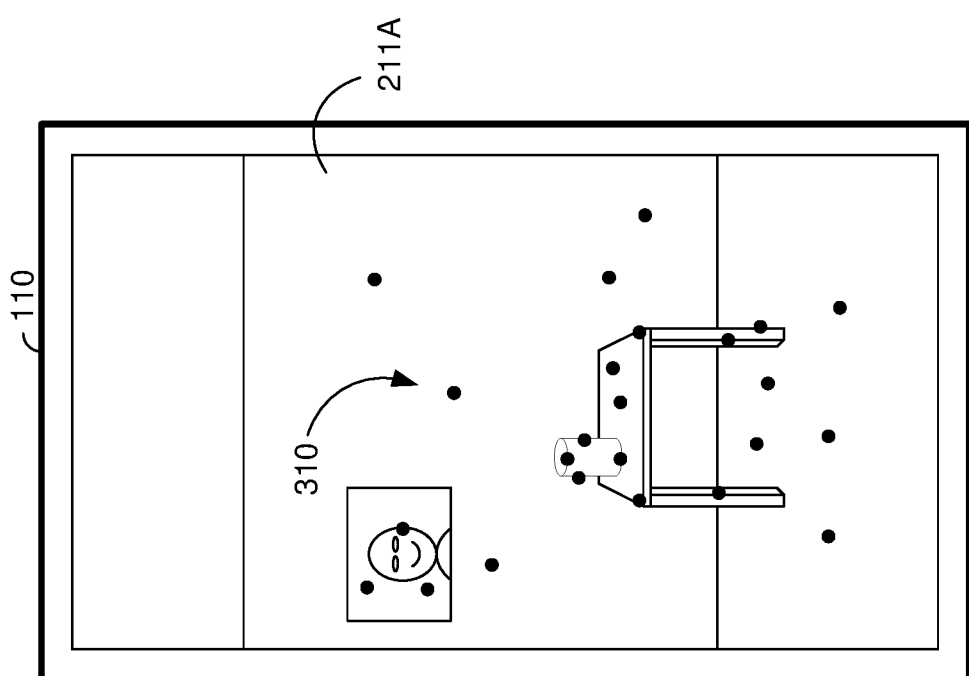

FIG. 3A illustrates the handheld electronic device 110 displaying the first image 211A overlaid with a representation of the first point cloud 310. FIG. 3B illustrates the handheld electronic device 110 displaying the second image 211B overlaid with the representation of the first point cloud 310.

The first point cloud includes a plurality of points, wherein each of the plurality of points is associated with a set of coordinates in a three-dimensional space. For example, in various implementations, each point is associated with an x-coordinate, a y-coordinate, and a z-coordinate. In various implementations, each point in the first point cloud corresponds to a feature in the physical environment 101, such as a surface of an object in the physical environment 101.

The handheld electronic device 110 spatially disambiguates the first point cloud into a plurality of first clusters. Accordingly, each of the clusters includes a subset of the points of the first point cloud.

Figure 4B:
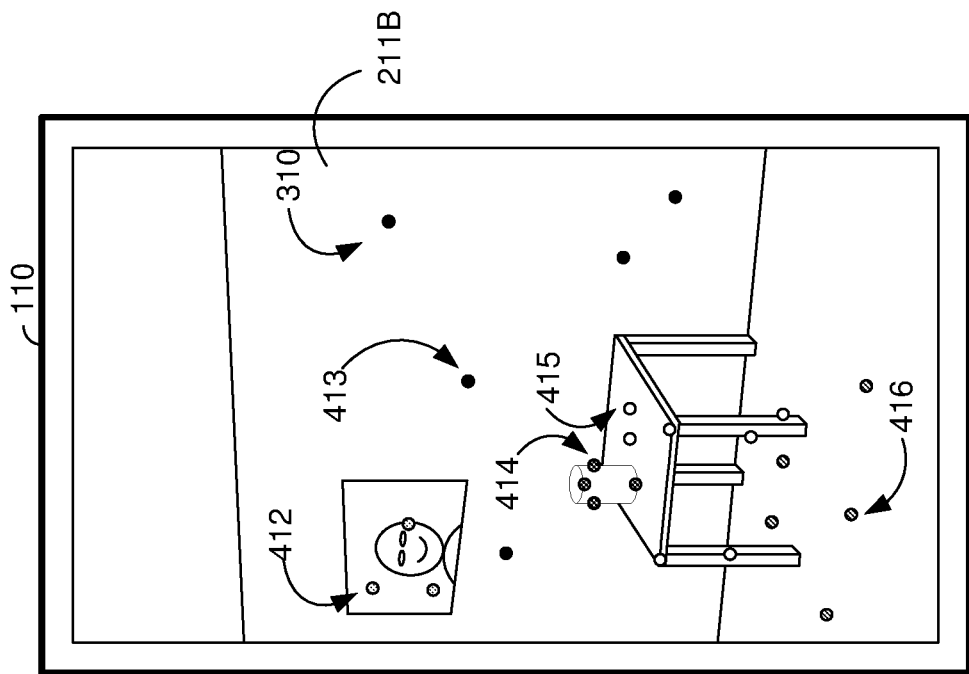
FIGS. 4A and 4B illustrate the handheld electronic device of FIG. 1 displaying the two images overlaid with a representation of the first point cloud spatially disambiguated into a plurality of first clusters.
Figure 4A:
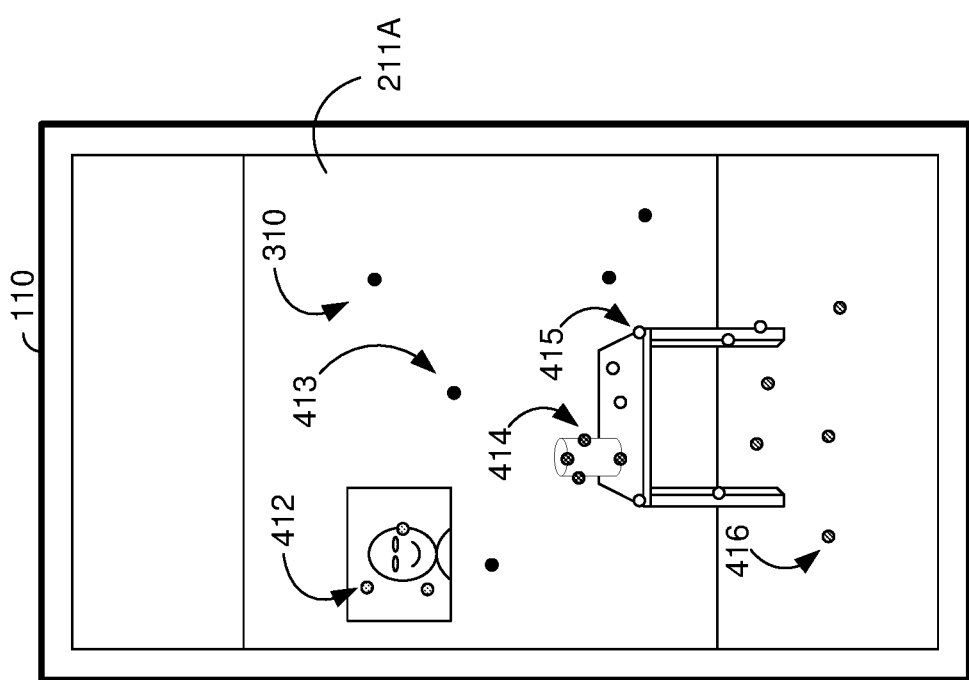

FIG. 4A illustrates the handheld electronic device 110 displaying the first image 211A overlaid with the representation of the first point cloud 310 spatially disambiguated into a plurality of first clusters 412-416. FIG. 4B illustrates the handheld electronic device 110 displaying the second image 211B overlaid with the representation of the first point cloud 310 spatially disambiguated into the plurality of first clusters 412-416. The representation of the first point cloud 310 includes a first cluster 412 (shown in light gray), a second cluster 413 (shown in black), a third cluster 414 (shown in dark gray), a fourth cluster 415 (shown in white), and a fifth cluster 416 (shown in medium gray).

In various implementations, each of the plurality of clusters is assigned a unique cluster identifier. For example, the clusters may be assigned numbers, letters, or other unique labels.

In various implementations, each of the plurality of first clusters is assigned a unique cluster identifier. For example, the clusters may be assigned numbers, letters, or other unique labels.

In various implementations, for each first cluster, the handheld electronic device 110 determines a semantic label. In various implementations, each first cluster corresponds to an object in the physical environment. For example, in FIG. 4A and FIG. 4B, the first cluster 412 corresponds to the picture 102, the second cluster 413 corresponds to the wall 103, the third cluster 414 corresponds to the cylinder 104, the fourth cluster 415 corresponds to the table 105, and the fifth cluster 416 corresponds to the floor 106. In various implementations, the semantic label indicates an object type or identity of the object. In various implementations, the handheld electronic device 110 stores the semantic label in association with each point of the first cluster.

In various implementations, the handheld electronic device 110 determines spatial relationships between the various first clusters. For example, in various implementations, the handheld electronic device 110 determines a distance between the first cluster 412 and the fifth cluster 416. As another example, in various implementations, the handheld electronic device 110 determines a bearing angle between first cluster 412 and the fourth cluster 415. In various implementations, the handheld electronic device 110 stores the spatial relationships between a particular first cluster and the other first clusters as a spatial relationship vector in association with each point of the particular first cluster.

In various implementations, the handheld electronic device 110 stores information regarding the first point cloud as a point cloud data object.

Figure 5:
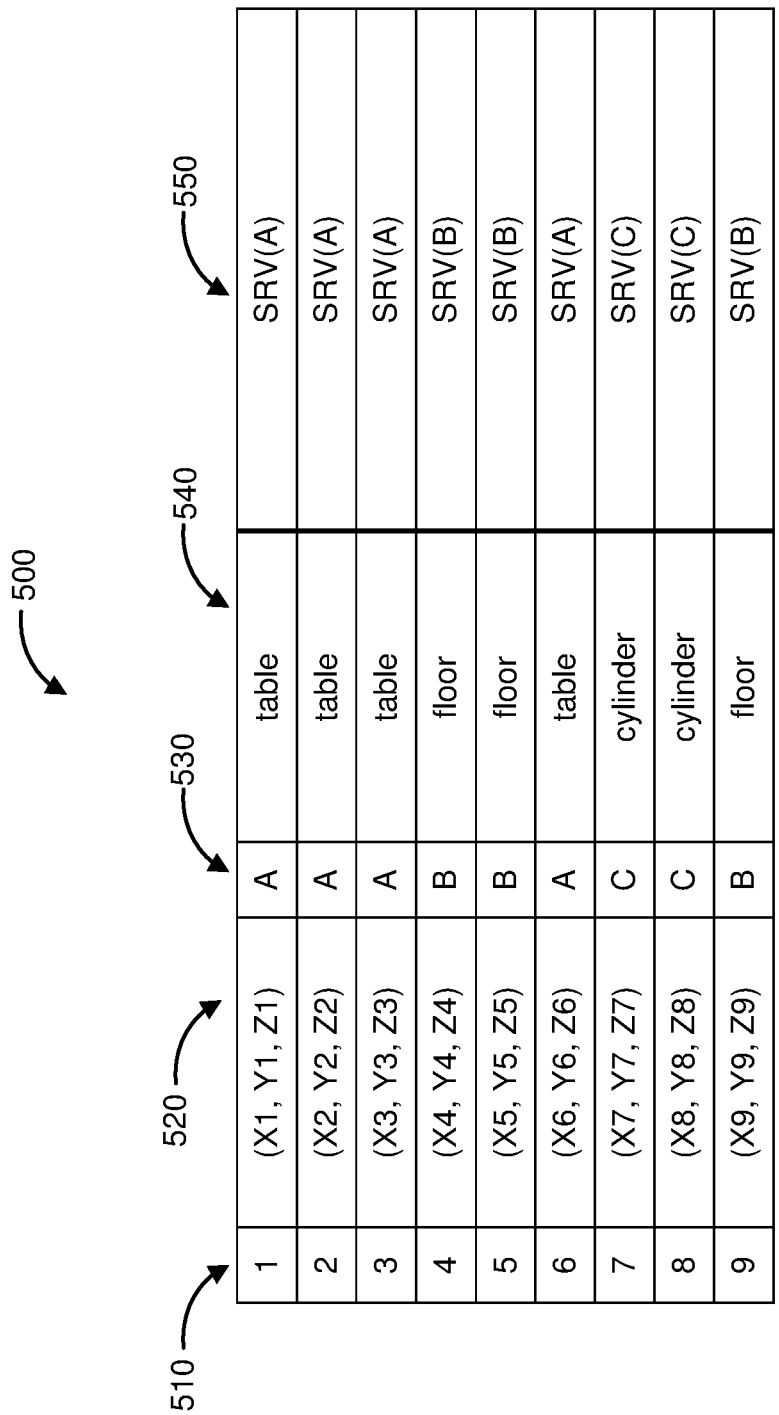
FIG. 5 illustrates a point cloud data object in accordance with some implementations.

FIG. 5 illustrates a point cloud data object 500 in accordance with some implementations. The point cloud data object 500 includes a plurality of data elements (shown as rows in FIG. 5), wherein each data element is associated with a particular point of a point cloud. The data element for a particular point includes a point identifier field 510 that includes a point identifier of a particular point. As an example, the point identifier may be a unique number. The data element for the particular point includes a coordinate field 520 that includes a set of coordinates in a three-dimensional space of the particular point. The data element for the particular point includes a cluster identifier field 530 that includes an identifier of the cluster into which the particular point is spatially disambiguated. As an example, the cluster identifier may be a letter or number. The data element for the particular point includes a semantic label field 540 that includes a semantic label for the cluster into which the particular point is spatially disambiguated. The data element for the particular point includes a spatial relationship vector field 550 that includes a spatial relationship vector for the cluster into which the particular point is spatially disambiguated.

The semantic labels and spatial relationships may be stored in association with the point cloud in other ways. For example, the point cloud may be stored as a set of cluster objects, each cluster object including a cluster identifier for a particular cluster, a semantic label of the particular cluster, a spatial relationship vector for the particular cluster, and a plurality of sets of coordinates corresponding to the plurality of points spatially disambiguated into the particular cluster.

The handheld electronic device 110 can use the semantic labels in a variety of ways. For example, in various implementations, the handheld electronic device 110 can display a virtual object, such as a virtual ball, on the top of a cluster labeled as a "table", but not on the top of a cluster labeled as a "floor". In various implementations, the handheld electronic device 110 can display a virtual object, such as a virtual painting, over a cluster labeled as a "picture", but not over a cluster labeled as a "television".

The handheld electronic device 110 can use the spatial relationship vectors in a variety of ways. For example, in various implementations, the handheld electronic device 110 can determine that objects in the physical environment are moving based on changes in the spatial relationship vectors. As another example, in various implementations, the handheld electronic device 110 can determine that a light emitting object is at a particular angle to another object and project light onto the other object from the particular angle. As another example, the handheld electronic device 110 can determine that an object is in contact with another object and simulate physics based on that contact.

Figure 6:
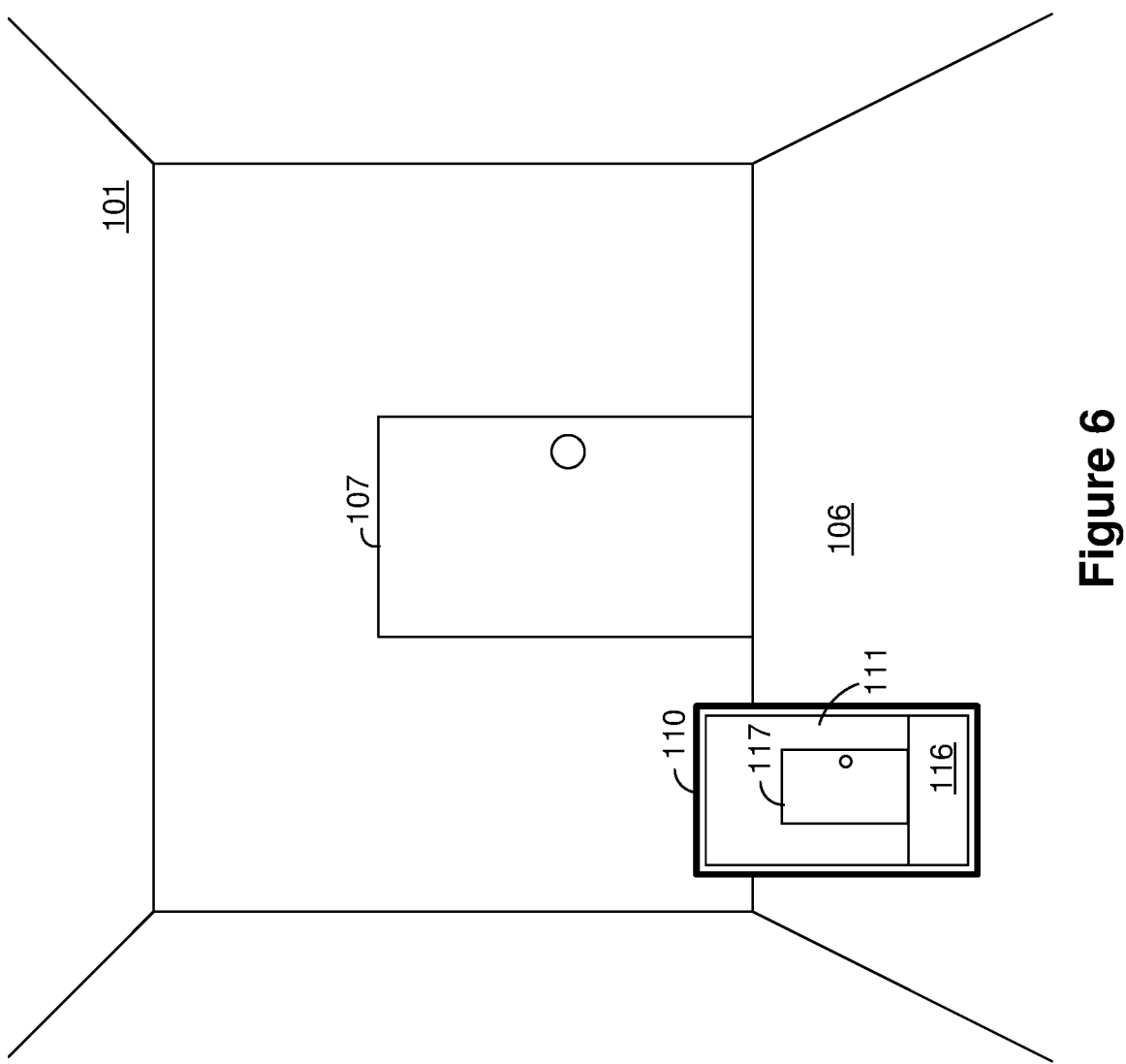
FIG. 6 illustrates the physical environment during a second time period with the handheld electronic device of FIG. 1 surveying the physical environment.

FIG. 6 illustrates the physical environment 101 during a second time period, subsequent to the first time period, with the handheld electronic device 110 surveying the physical environment 101. In FIG. 6, during the second time period, the handheld electronic device 110 has been turned around to face what was the rear of the physical environment in FIG. 1. The physical environment 101 includes the floor 106 and a door 107.

The handheld electronic device 110 displays, on a display, a representation of the physical environment 111 including a representation of the floor 116 and a representation of the door 117. In various implementations, the representation of the physical environment 111 is generated based on an image of the physical environment captured with a scene camera of the handheld electronic device 110 having a field-of-view directed toward the physical environment 101.

Using a plurality of images of the physical environment 101 during the second time period captured from a plurality of different perspectives, the handheld electronic device 110 generates a second point cloud of the physical environment 101. In various implementations, the handheld electronic device 110 generates the second point cloud as a new point cloud of the physical environment 101 independent of the first point cloud of the physical environment 101 generated by the plurality of images of the physical environment 101 during the first time period including the first image 211A and the second image 211B. In various implementations, the handheld electronic device 110 generates the second point cloud by adding points to and/or removing points from the first point cloud.

In various implementations, the handheld electronic device 110 spatially disambiguates the second point cloud into a plurality of second clusters. In various implementations, the handheld electronic device 110 determines semantic labels and/or spatial relationships of the second clusters.

Figure 7:
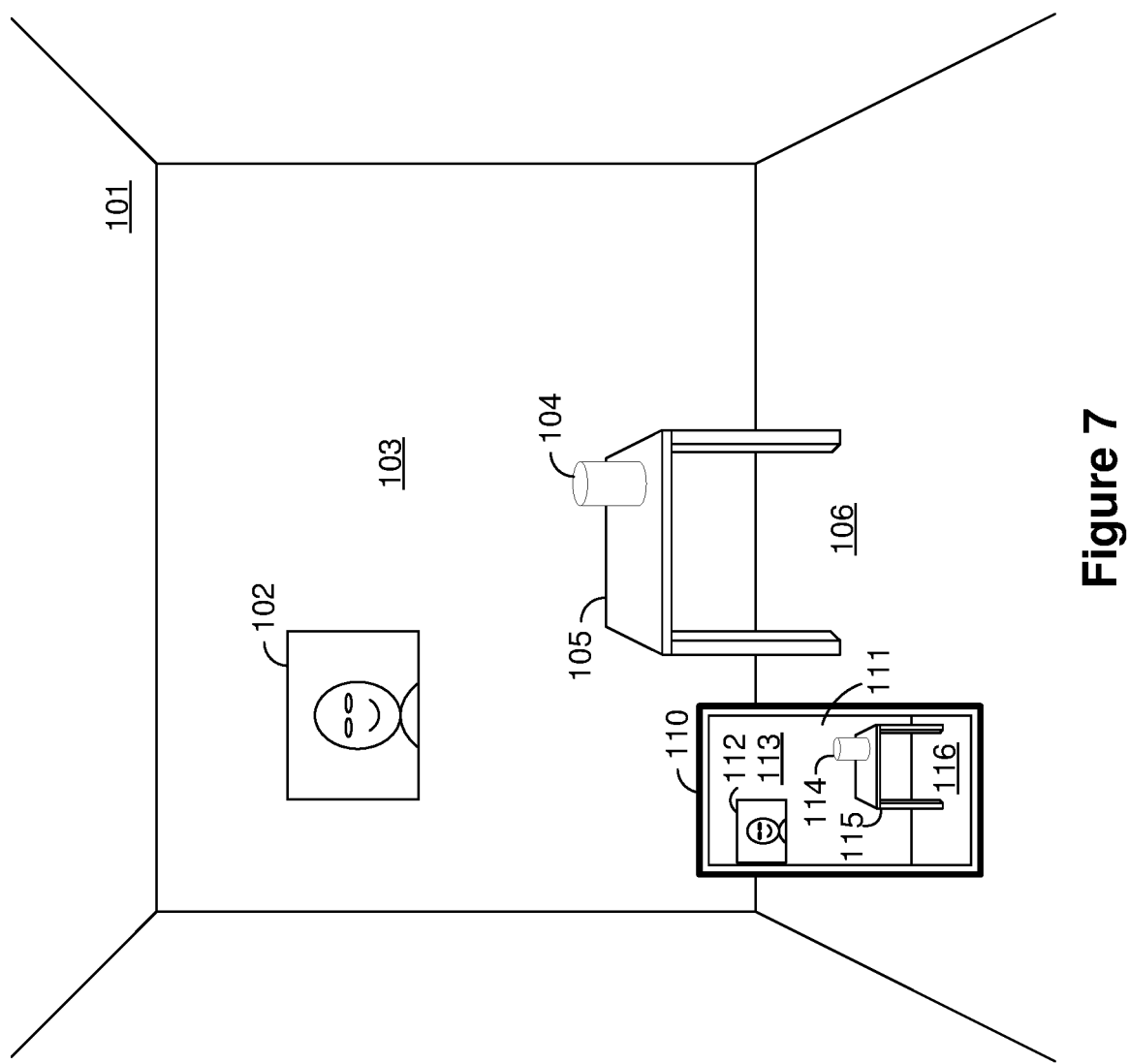
FIG. 7 illustrates the physical environment during a third time period with the handheld electronic device of FIG. 1 surveying the physical environment.

FIG. 7 illustrates the physical environment 101 during a third time period, subsequent to the second time period, with the handheld electronic device 110 surveying the physical environment 101. In FIG. 7, during the third time period, the handheld electronic device 110 has been turned back around to face the front of the physical environment as in FIG. 1. Thus, the physical environment 101 includes the picture 102 hanging on the wall 103, the table 105 on the floor 106, and the cylinder 104 on the table 105. However, the location of the cylinder 104 has moved from the left side of the table 105 in FIG. 1 to the right side of the table in FIG. 7.

The handheld electronic device 110 displays, on a display, the representation of the physical environment 111 including the representation of the picture 112 hanging on the representation of the wall 113, the representation of the table 115 on a representation of the floor 116, and the representation of the cylinder 114 (in a new position) on the representation of the table 115.

Figure 8B:
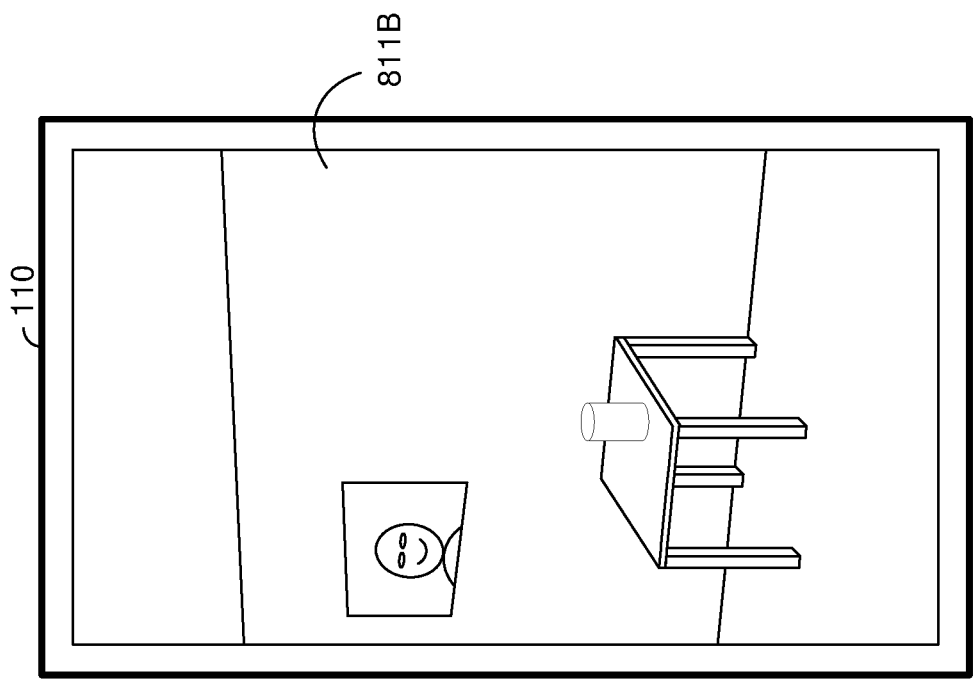
FIGS. 8A and 8B illustrate the handheld electronic device of FIG. 1 displaying two images of the physical environment during the third time period captured from different perspectives.
Figure 8A:
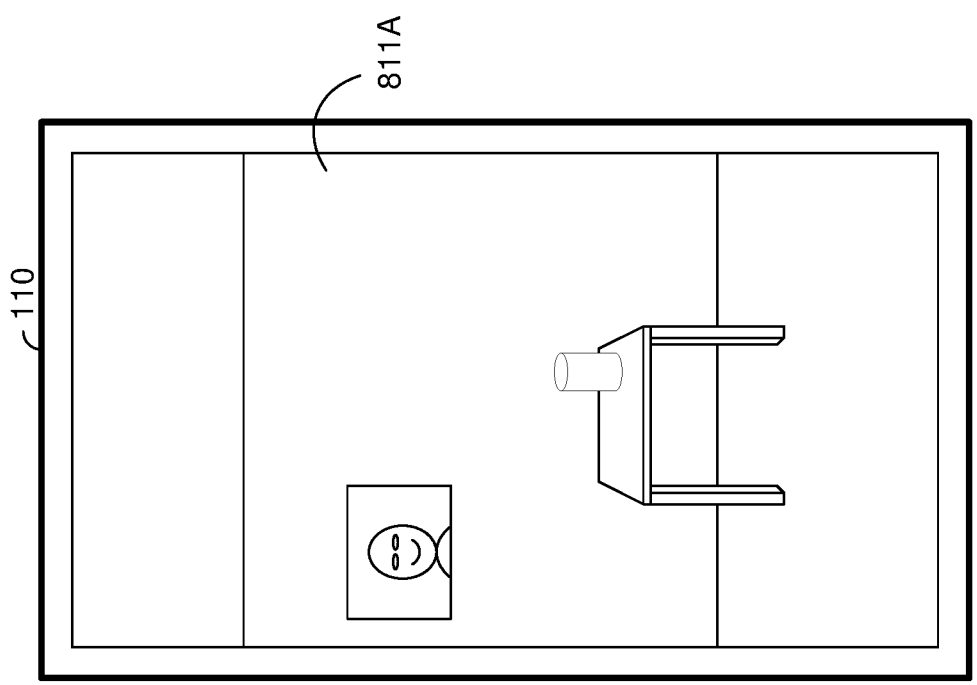

FIG. 8A illustrates the handheld electronic device 110 displaying a third image 811A of the physical environment 101 during the third time period captured from the first perspective. FIG. 8B illustrates the handheld electronic device 110 displaying a fourth image 811B of the physical environment 101 during the third time period captured from the second perspective.

In various implementations, the third image 811A and the fourth image 811B are captured by the same camera at different times within the third time period (e.g., by the same single scene camera at two different times when the handheld electronic device 110 is moved between the two different times). In various implementations, the third image 811A and the fourth image 811B are captured by different cameras at the same time (e.g., by two scene cameras) within the third time period.

Using a plurality of images of the physical environment 101 during the third time period captured from a plurality of different perspectives, such as the third image 811A and the fourth image 811B, the handheld electronic device 110 generates a third point cloud of the physical environment 101. In various implementations, the handheld electronic device 110 generates the third point cloud as a new point cloud of the physical environment 101 independent of the first point cloud and the second point cloud. In various implementations, the handheld electronic device 110 generates the third point cloud by adding points to and/or removing points from the first point cloud and/or the second point cloud.

Figure 9B:
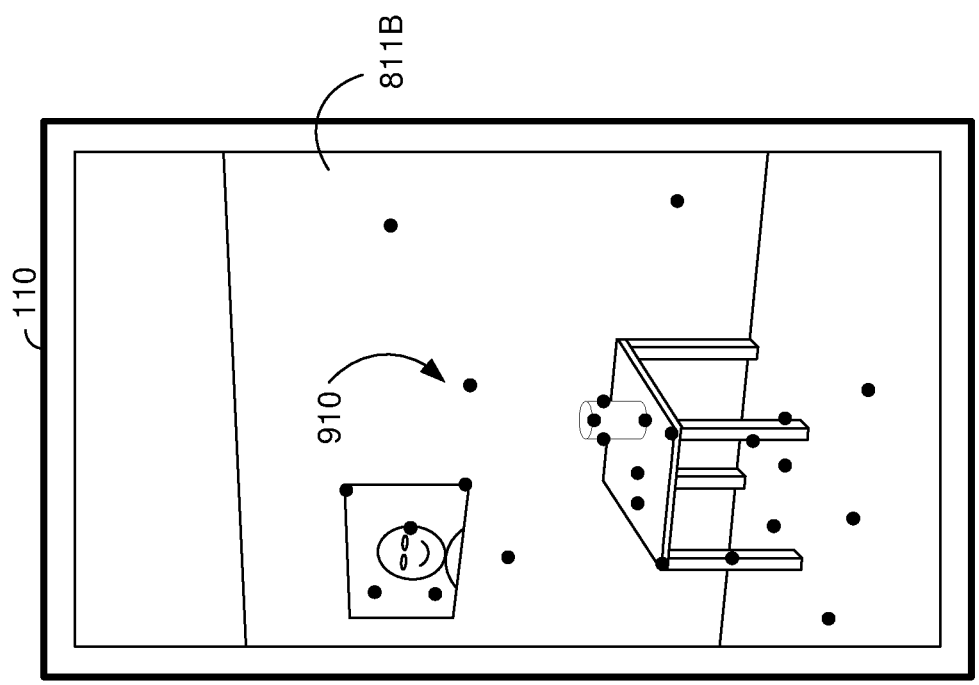
FIGS. 9A and 9B illustrate the handheld electronic device of FIG. 1 displaying the two images overlaid with a representation of a third point cloud.
Figure 9A:
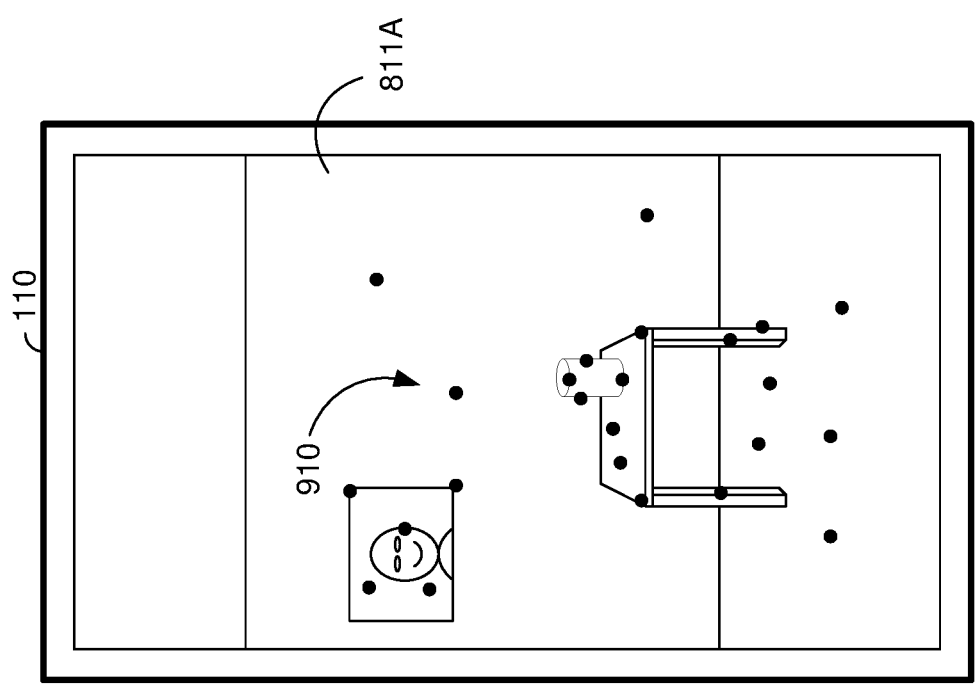

FIG. 9A illustrates the handheld electronic device 110 displaying the third image 811A overlaid with a representation of a third point cloud 910. FIG. 9B illustrates the handheld electronic device 110 displaying the fourth image 811B overlaid with the representation of the third point cloud 910.

The handheld electronic device 110 spatially disambiguates the third point cloud into a plurality of third clusters. In various implementations, each of the plurality of third clusters is assigned a unique cluster identifier. However, in various implementations, the assigned cluster identifiers may be the same as those previously assigned to one or more of the plurality of first clusters.

Figure 10B:
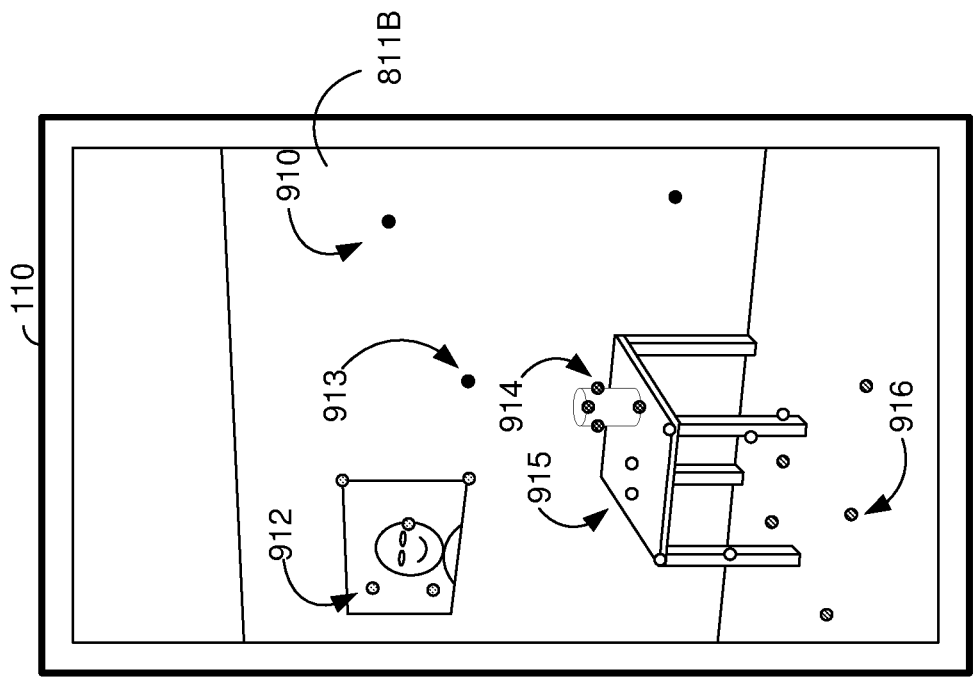
FIGS. 10A and 10B illustrate the handheld electronic device of FIG. 1 displaying the two images overlaid with the representation of the third point cloud spatially disambiguated into a plurality of third clusters.
Figure 10A:
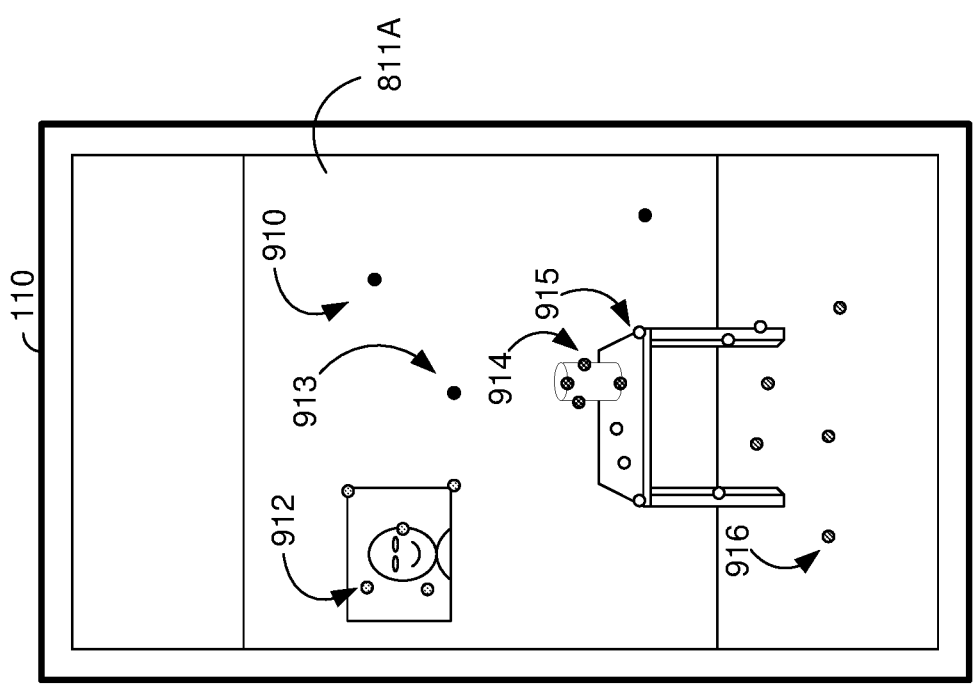

FIG. 10A illustrates the handheld electronic device 110 displaying the third image 811A overlaid with the representation of the third point cloud 910 spatially disambiguated into a plurality of third clusters 912-916. FIG. 10B illustrates the handheld electronic device 110 displaying the fourth image 811B overlaid with the representation of the third point cloud 910 spatially disambiguated into the plurality of third clusters 912-916. The representation of the third point cloud 910 includes a first cluster 912 (shown in light gray), a second cluster 913 (shown in black), a third cluster 914 (shown in dark gray), a fourth cluster 915 (shown in white), and a fifth cluster 916 (shown in medium gray).

In various implementations, at least one of the third clusters is the same as a corresponding one of the first clusters. For example, the fifth cluster 916 of FIG. 10A is the same as the fifth cluster 416 of FIG. 4A.

In various implementations, at least one of the third clusters includes the points of a corresponding one of the first clusters as well as additional points. For example, the first cluster 912 of FIG. 10A includes the points of the first cluster 412 of FIG. 4A as well as additional points.

In various implementations, at least one of the third clusters includes some, but not all, of the points of a corresponding one of the first clusters. For example, the second cluster 913 of FIG. 10A includes some, but not all, of the points of the second cluster 413 of FIG. 4A.

In various implementations, at least one of the third clusters includes some, but not all, of the points of a corresponding one of the first clusters as well as additional points. For example, the fourth cluster 915 of FIG. 10A includes some, but not all, of the points of the fourth cluster 415 of FIG. 4A as well as additional points.

In various implementations, at least one of the third clusters includes none of the points of a corresponding one of the first clusters. For example, the third cluster 914 includes none of the points of the third cluster 414 of FIG. 4A.

In various implementations, each of the plurality of third clusters is assigned a unique cluster identifier. However, in various implementations, the cluster identifier assigned to a particular third cluster may be the same as the cluster identifier assigned to a corresponding first cluster.

In various implementations, for each third cluster, the handheld electronic device 110 determines a semantic label. In various implementations, after assigning a particular third cluster the same cluster identifier assigned to a corresponding first cluster, the handheld electronic device 110 determines the semantic label as the semantic label of the corresponding first cluster. In various implementations, after determining the semantic label of a particular third cluster, based at least in part on the semantic label of the particular third cluster matching the semantic label of a corresponding first cluster (e.g., being the same), the handheld electronic device 110 assigns the particular third cluster the same cluster identifier assigned to the corresponding first cluster. Thus, in various implementations, the assigned cluster identifier is used to determine the semantic label and, in various implementations, the semantic label is used to determine the cluster identifier. In other words, in various implementations, the cluster identifier is based on the semantic label and, in various implementations, the semantic label is based on the cluster identifier.

In various implementations, the handheld electronic device 110 determines spatial relationships between the various third clusters. In various implementations, after assigning two particular third clusters the same cluster identifiers assigned to two corresponding first clusters, the handheld electronic device 110 determines the spatial relationships between the two particular third clusters as the spatial relationships of the corresponding first clusters. In various implementations, after determining the spatial relationships of two particular third clusters, based at least in part on the spatial relationships between the two particular third clusters matching the spatial relationships between two corresponding first clusters (e.g., being the same or being different by less than a threshold), the handheld electronic device 110 assigns at least one of the two particular third clusters the same cluster identifier respectively assigned to at least one of two corresponding first clusters. Thus, in various implementations, the assigned cluster identifier is used to determine the spatial relationships and, in various implementations, the spatial relationships are used to determine the cluster identifier. In other words, in various implementations, the cluster identifier is based on the spatial relationships and, in various implementations, the spatial relationships are based on the cluster identifier.

In various implementations, based on a particular third cluster being assigned the cluster identifier assigned to a corresponding first cluster, points of the corresponding first cluster not included in the particular third cluster are added to the third cluster (and the third point cloud) to generate a supplemented third point cloud.

Figure 11B:
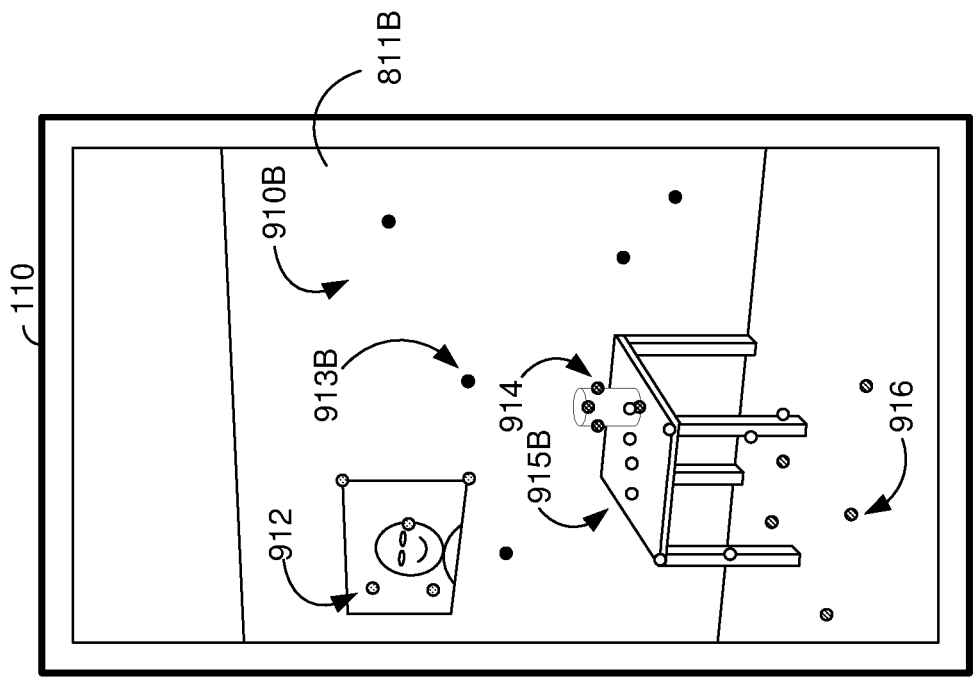
FIGS. 11A and 11B illustrate the handheld electronic device of FIG. 1 displaying the two images overlaid with representation of a supplemented third point cloud.
Figure 11A:
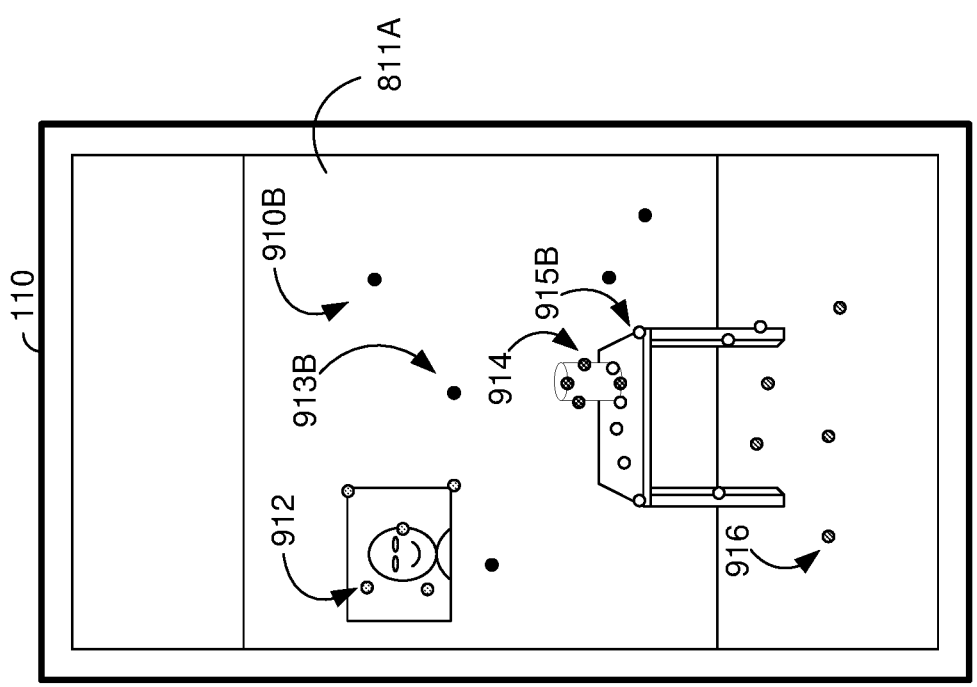

FIG. 11A illustrates the handheld electronic device 110 displaying the third image 811A overlaid with the representation of a supplemented third point cloud 910B. FIG. 11B illustrates the handheld electronic device 110 displaying the fourth image 811B overlaid with the representation of the supplemented third point cloud 910B. In FIG. 11A, the second cluster 913 of FIG. 10A is supplemented with points from the second cluster 413 of FIG. 4A to generate a supplemented second cluster 913B. In FIG. 11A, the fourth cluster 915 of FIG. 10A is supplemented with points from the fourth cluster 415 of FIG. 4A to generate a supplemented fourth cluster 915B. However, in FIG. 11A, because the third cluster 914 of FIG. 10A and the third cluster 414 of FIG. 4A share no points (because the cylinder 104 moved between the first time period and the third time period), the third cluster 914 of FIG. 10A is not supplemented with points from the third cluster 414 of FIG. 4A. However, in various implementations, the third cluster 914 of FIG. 10A is supplemented with points from the third cluster 414 of FIG. 4A translated and/or rotated according to the motion of the corresponding object (e.g., as determined by the change in spatial relationships of the cluster with other clusters) to generate a supplemented third cluster.

The representation of the supplemented third point cloud 910B includes points that are visually occluded during the third time period. In particular, the supplemented fourth cluster 915B includes at least one point corresponding a portion of the table 105 that is occluded by the cylinder 104 during the third time period. Thus, in various implementations, an XR application can be presented in which the representation of the cylinder 114 is made transparent, moved, or removed to reveal the table surface beneath (without changing any property of the real cylinder 104). In various implementations, a supplemented third cluster includes at least one point not within the field-of-view of the scene camera during the third time period (e.g., corresponding to the back of the cylinder 104). Thus, in various implementations, an XR application can be presented in which a virtual camera is moved to a perspective in which the back of the representation of the cylinder 114 is displayed without moving the handheld electronic device 110 into the perspective.

In various implementations, the handheld electronic device 110 stores information regarding the third point cloud as a point cloud data object. In various implementations, storing the information regarding the third point cloud includes updating a point cloud data object corresponding to the first point cloud and/or second point cloud. In various implementations, updating the point cloud data object includes adding data items, removing data items, and/or modifying data items.

FIG. 12 is a flowchart representation of a method 1200 of blind object tracking in accordance with some implementations. In various implementations, the method 1200 is performed by a device with one or more processors and non-transitory memory. In some implementations, the method 1200 is performed by processing logic, including hardware, firmware, software, or a combination thereof. In some implementations, the method 1200 is performed by a processor executing instructions (e.g., code) stored in a non-transitory computer-readable medium (e.g., a memory).

The method 1200 begins, in block 1210, with the device obtaining a first three-dimensional scene model of a physical environment during a first time period including a first plurality of points, wherein each of the first plurality of points is associated with a set of coordinates in a three-dimensional space, wherein a subset of the first plurality of points is associated with a particular cluster identifier.

The first three-dimensional scene model of the physical environment represents the physical environment during a first time period. In various implementations, the first time period is an instant, a fraction of a second, a few seconds, a few hours, a few days, or any length of time. In various implementations, the device obtains the first three-dimensional scene model during the first time period. In various implementations, the device obtains the first three-dimensional scene model after the first time period.

In various implementations, the first three-dimensional scene model includes the first plurality of points as vertices of one or more mesh-based object models, wherein the one or more mesh-based object models include one or more edges between the vertices. In various implementations, the mesh-based object models further include one or more faces surrounded by edges, one or more textures associated with the faces, and/or a semantic label, object/cluster identifier, physics data or other information associated with the mesh-based object model.

The first plurality of points, alone or as the vertices of mesh-based object models, is a first point cloud. Accordingly, in various implementations, obtaining the first three-dimensional scene model includes obtaining a first point cloud.

In various implementations, obtaining the first point cloud includes obtaining a first plurality of images of the physical environment during the first time period from a plurality of different perspectives and generating the first point cloud based on the plurality of images of the physical environment during the first time period. For example, in various implementations, the device detects the same feature in two or more images of the physical environment during the first time period and using perspective transform geometry, determines the sets of coordinates in the three-dimensional space of the feature. In various implementations, the plurality of images of the physical environment during the first time period is captured by the same camera at different times during the first time period (e.g., by the same single scene camera of the device at different times when the device is moved between the times). In various implementations, the plurality of images is captured by different cameras at the same time during the first time period (e.g., by multiple scene cameras of the device).

In various implementations, obtaining the first point cloud includes obtaining an image of a physical environment during the first time period, obtaining a depth map of the image of the physical environment, and generating the first point cloud based on the image of the physical environment during the first time period and the depth map of the image of the physical environment. In various implementations, the image is captured by a scene camera of the device and the depth map of the image of the physical environment is generated by a depth sensor of the device.

In various implementations, obtaining the first point cloud includes using a 3D scanner to generate the first point cloud.

In various implementations, each point in the first point cloud is associated with additional data. In various implementations, each point in the first point cloud is associated with a color. In various implementations, each point in the first point cloud is associated with a color-variation indicating how the point changes color over time. As an example, such information may be useful in discriminating between a semantic label of a "picture" or a "television". In various implementations, each point in the first point cloud is associated with a confidence indicating a probability that the set of coordinates in the three-dimensional space of the point is the true location of the corresponding surface of the object in the physical environment.

In various implementations, obtaining the first point cloud includes spatially disambiguating portions of the plurality of points into a plurality of first clusters including the subset of the first plurality of points associated with the particular cluster identifier. Each first cluster includes a subset of the plurality of points of the first point cloud and is assigned a unique cluster identifier. In various implementations, particular points of the plurality of points (e.g., those designated as noise) are not included in any of the plurality of first clusters.

Various point cloud clustering algorithms can be used to spatially disambiguate the first point cloud. In various implementations, spatially disambiguating portions of the plurality of points into the plurality of first clusters includes performing plane model segmentation. Accordingly, certain clusters of the plurality of first clusters correspond to sets of points of the first point cloud that lie in the same plane. In various implementations, spatially disambiguating portions of the plurality of points into the plurality of first clusters includes performing Euclidean cluster extraction.

The method 1200 continues, in block 1220, with the device obtaining a second three-dimensional scene model of a physical environment during a second time period subsequent to the first time period including a second plurality of points, wherein each of the second plurality of points is associated with a set of coordinates in a three-dimensional space.

The second three-dimensional scene model of the physical environment represents the physical environment during a second time period subsequent to the first time period. In various implementations, the second time period is an instant, a fraction of a second, a few seconds, a few hours, a few days, or any length of time. In various implementations, the device obtains the second three-dimensional scene model during the second time period. In various implementations, the device obtains the first three-dimensional scene model after the second time period.

In various implementations, the second three-dimensional scene model includes the second plurality of points as vertices of one or more mesh-based object models, wherein the one or more mesh-based object models include one or more edges between the vertices. In various implementations, the mesh-based object models further include one or more faces surrounded by edges, one or more textures associated with the faces, and/or a semantic label, object/cluster identifier, physics data or other information associated with the mesh-based object model.

The second plurality of points, whether alone or as the vertices of mesh-based object models, is a second point cloud. Accordingly, in various implementations, obtaining the second three-dimensional scene model includes obtaining a second point cloud.

In various implementations, obtaining the second point cloud includes obtaining a second plurality of images of the physical environment during the second time period from a plurality of different perspectives and generating the second point cloud based on the plurality of images of the physical environment during the second time period.

In various implementations, obtaining the second point cloud includes obtaining an image of a physical environment during the second time period, obtaining a depth map of the image of the physical environment, and generating the second point cloud based on the image of the physical environment during the second time period and the depth map of the image of the physical environment. In various implementations, the image is captured by a scene camera of the device and the depth map of the image of the physical environment is generated by a depth sensor of the device.

In various implementations, the device does not obtain an image of the physical environment (or at least a particular portion of the physical environment) during a third time period between the first time period and the second time period. For example, with respect to FIG. 1, the handheld electronic device 110 surveys the front of the physical environment 101. Subsequently, with respect to FIG. 6, the handheld electronic device 110 does not survey the front of the physical environment 101 (but, rather, surveys the rear of the physical environment 101). Subsequently, with respect to the FIG. 7, the handheld electronic device 110 surveys the front of the physical environment 101. In various implementations, the third period of time, separating the first period of time and the second period of time, is a few seconds, a few minutes, a few hours, a few days or any length of time.

In various implementations, each point in the second point cloud is associated with additional data. In various implementations, each point in the second point cloud is associated with a color. In various implementations, each point in the second point cloud is associated with a color-variation indicating how the point changes color over time. As an example, such information may be useful in discriminating between a semantic label of a "picture" or a "television". In various implementations, each point in the second point cloud is associated with a confidence indicating a probability that the set of coordinates in the three-dimensional space of the point is the true location of the corresponding surface of the object in the physical environment.

In various implementations, obtaining the second point cloud is based on the first point cloud, with newly detected points added to the first point cloud, redetected points maintained in the first point cloud, and undetected points removed from the first point cloud. In various implementations, the threshold level of confidence for a newly detected point to be added to the first point cloud is greater than the threshold level of confidence for a redetected point to be maintained in the first point cloud.

In various implementations, obtaining the second point cloud includes spatially disambiguating portions of the plurality of points into a plurality of second clusters. Each second cluster includes a subset of the plurality of points of the second point cloud and is assigned a unique cluster identifier. As described above (and below), in various implementations, at least one of the second clusters is assigned the particular cluster identifier assigned to a particular first cluster.

The method 1200 continues, in block 1230, with the device associating a subset of the second plurality of points with the particular cluster identifier, wherein the subset of the second plurality of points includes points with different sets of coordinates in the three-dimensional space than the points of the subset of the first plurality of points.

In various implementations, the subset of the second plurality of points includes the points of the subset of the first plurality of points and one or more additional points. In various implementations, the subset of the second plurality of points includes some, but not all, of the subset of the first plurality of points and one or more additional points. In various implementations, the subset of the second plurality of points includes none of the subset of the first plurality of points.

In various implementations, the device associates the subset of the second plurality with the particular cluster identifier (e.g., the device assigns a particular second cluster the same cluster identifier as a particular first cluster) based on one or more factors.

One factor is the number (or percentage) of points in the subset of the second plurality of points that are the same as the points in the subset of the first plurality of points. Accordingly, in various implementations, associating the subset of the second plurality of points with the particular cluster identifier is based on an amount of the second plurality of points having substantially similar sets of coordinates in the three-dimensional space to the sets of coordinates in the three-dimensional space of the subset of the first plurality of points. For example, if the subset of the second plurality of points includes more of the subset of the first plurality of points, the device is more likely to associate the subset of the second plurality of points with the particular cluster identifier. As another example, if the subset of the second plurality of points includes fewer points that are not in the subset of the first plurality of points, the device is more likely to associate the subset of the second plurality of points with the particular cluster identifier.

One factor is the spatial relationship between the subset of the second plurality of points and the subset of the first plurality of points. Accordingly, in various implementations, associating the subset of the second plurality of points with the particular cluster identifier is based on a spatial relationship between the subset of the second plurality of points and the subset of the first plurality of points. For example, if the subset of the second plurality of points and the subset of the first plurality of points have the same (or similar) relative orientation, the device is more likely to associate the subset of the second plurality of points with the particular cluster identifier. As another example, if the distance between the subset of the second plurality of points and the subset of the first plurality of points is small, the device is more likely to associate the subset of the second plurality of points with the particular cluster. Thus, in various implementations, associating the subset of the second plurality of points with the particular cluster identifier is based on a distance between the subset of the second plurality of points and the subset of the first plurality of points.

In various implementations, the device, based on the volumetric arrangement of the subset of the second plurality of points and the subset of the first plurality of points, determines a spatial relationship vector that characterizes the spatial relationship between the subset of the second plurality of points and the subset of the first plurality of points.

Figure 13:
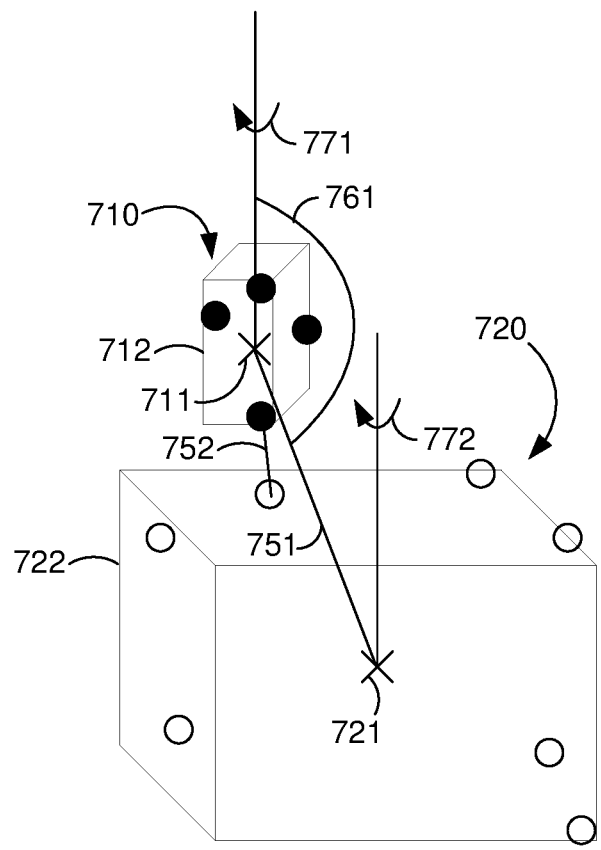
FIG. 13 illustrates spatial relationships between a first cluster of points and a second cluster of points in accordance with some implementations.

FIG. 13 illustrates spatial relationships between a first cluster of points 710 (shown in black) and a second cluster of points 720 (shown in white) in accordance with some implementations.

In various implementations, the spatial relationship vector includes a distance between the subset of the second plurality of points and the subset of the first plurality of points. In various implementations, the distance is a distance between the center of the subset of the second plurality of points and the center of the subset of the first plurality of points. For example, FIG. 13 illustrates the distance 751 between the center 711 of the first cluster of points 710 and the center 721 of the second cluster of points 720. In various implementations, the distance is a minimum distance between the closest points of the subset of the second plurality of points and the subset of the first plurality of points. For example, FIG. 13 illustrates the distance 752 between the closest points of the first cluster of point 710 and the second cluster of points 720. In various implementations, the spatial relationship vector indicates whether the subset of the second plurality of points contacts the subset of the first plurality of points.

In various implementations, the spatial relationship vector includes a bearing angle between the subset of the second plurality of points and the subset of the first plurality of points. In various implementations, the bearing angle is determined as the bearing from the center of the subset of the second plurality of points to the center of the subset of the first plurality of points. For example, FIG. 7 illustrates the bearing angle 761 between the center 711 of the first cluster of points 710 and the center 721 of the second cluster of points 720. Although only a single bearing angle is illustrated in FIG. 13, it is two be appreciated that in three dimensions, the bearing angle may have two components. In various implementations, the spatial relationship vector includes a bearing arc between the subset of the second plurality of points and the subset of the first plurality of points. In various implementations, the bearing arc includes the bearing angle and the number of degrees encompassed by the subset of the first plurality of points as viewed from the center of the subset of the second plurality of points.

In various implementations, the spatial relationship vector includes a relative orientation of the subset of the second plurality of points with respect to the subset of the first plurality of points. The relative orientation of the subset of the second plurality of points with respect to the subset of the first plurality of points indicates how much the subset of the second plurality of points is rotated with respect to the subset of the first plurality of points. For example, a cluster of points corresponding to a wall may be rotated 90 degrees with respect to a cluster of points generated by a floor (or 90 degrees about a different axis with respect to a cluster of points generated by another wall). FIG. 13 illustrates a first orientation 771 about a vertical axis of the first cluster of points 710 and a second orientation 772 about the vertical axis of the second cluster of points 772. In various implementations, the relative orientation is the difference between these two orientations. Although only a single orientation is illustrated in FIG. 13, it is to be appreciated that in three dimensions, the relative orientation may have two or three components.

In various implementations, the spatial relationship vector includes an element that is changed by a change in position or orientation of the subset of the second plurality of points with respect to the subset of the first plurality of points. For example, in various implementations, the element includes a distance, bearing, and orientation.

In various implementations, determining the spatial relationship vector includes determining a bounding box surrounding the subset of the second plurality of points and a bounding box surrounding the subset of the first plurality of points. For example, FIG. 13 illustrates a first bounding box 712 surrounding the first cluster of points 710 and a second bounding box 722 surrounding the second cluster of points 720. In various implementations, the center of the first cluster of points is determined as the center of the first bounding box and the center of the second cluster of points is determined as the center of the second bounding box. In various implementations, the distance between the first cluster of points and the second cluster of points is determined as the distance between the center of the first bounding box and the center of the second bounding box. In various implementations, the distance between the first cluster of points and the second cluster of points is determined as the minimum distance between the first bounding box and the second bounding box.

In various implementations, the orientation 771 of the first cluster of points and the orientation 772 of the second cluster of points are determined as the orientation of the first bounding box 712 and the orientation of the second bounding box 722.

In various implementations, the faces of the bounding boxes are given unique identifiers (e.g., the faces of each bounding box are labelled 1 through 6) to resolve ambiguities. The unique identifiers can be based on color of the points or the distribution of the points. Thus, if the second cluster of points rotates 90 degrees, the relative orientation is determined to have changed.

One factor is a comparison of the spatial relationships of the subset of the second plurality of points and the subset of the first plurality of points with another cluster. For example, in various implementation, a second subset of the second plurality of points is assigned the same cluster identifier as a second subset of the first plurality of points (e.g., based on those two second subsets having substantially the same points). A comparison between (1) the spatial relationship between the subset of the second plurality of points and the second subset of the second plurality of points and (2) the spatial relationship between the subset of the first plurality of points and the second subset of the first plurality of points provides information about whether the subset of the second plurality of points corresponds to the same object as the subset of the first plurality of points. For example, if the second subsets correspond to the table 105, the spatial relationship between the subset of the second plurality of points and the table 105 and the spatial relationship between the subset of the first plurality of points and the table 105 may both indicate that those subsets contact and/or are on top of the table 105 and are, thus, more likely to correspond to the same object. Accordingly, associating the subset of the second plurality of points with the particular cluster identifier is based on a comparison between (1) a spatial relationship between the subset of the second plurality of points and another subset of the second plurality of points and (2) a spatial relationship between the subset of the first plurality of points and another (corresponding) subset of the first plurality of points.

One factor is an amount of time between the first time period and the second time period (e.g., the length of the third time period). Accordingly, associating the subset of the second plurality of points with the particular cluster identifier is based on an amount of time between the first time period and the second time period. For example, if the amount of time between the first time period and the second time period is short, the device is more likely to associate the subset of the second plurality of points with the particular cluster identifier. For example, if the amount of time between the first time period and the second time period is short, the device is more likely to determine that the third cluster 914 in FIG. 10A and the third cluster 414 in FIG. 4A correspond to the same cylinder 104. However, if the amount of time between the first time period and the second time period is long, the device may determine that the cylinder 104 has been removed from the physical environment 101 and that the third cluster 914 in FIG. 10A corresponds to a different cylinder.

One factor is a semantic label of the subset of the first plurality of points. Accordingly, in various implementations, associating the subset of the second plurality of points with the particular cluster identifier is based on a semantic label of subset of the first plurality of points. In various implementations, the semantic label indicates a permanence or ease of mobility of the corresponding object. For example, if the semantic label is "table", the device is more likely to associate the subset of the second plurality of points with the particular cluster identifier than if the semantic label is "banana". As another example, if the semantic label is "wall", the device is more likely to require a smaller distance change in order to associate the subset of the second plurality of points with the second identifier than if the semantic label is "chair".

One factor is a semantic label of the subset of the second plurality of points. Accordingly, in various implementations, the subset of the first plurality of points is further associated with a first semantic label and the second subset of the second plurality of points is further associated with a second semantic label. In various implementations, associating the subset of the second plurality of points with the particular cluster identifier is based on a comparison between the first semantic label and the second semantic label. For example, if the semantic labels match, the device is more likely to associate the subset of the second plurality of points with the particular cluster identifier.

In various implementations, obtaining the first three-dimensional scene model includes determining the semantic label of the subset of the first plurality of points. In various implementations, the device determines the semantic label by determining a flatness of the subset of the first plurality of points. For example, if a bounding box surrounding the subset of the first plurality of points has a depth in a dimension that is substantially smaller than its height and width, the subset is "flat." If the flat subset is vertical, the device determines a semantic label of "wall". If the flat subset is horizontal, the device determines a semantic label of "tabletop", but if the subset is the lowest such horizontal subset, the device determines a semantic label of "floor".

In various implementations, the device determines the semantic label with a neural network. In particular, the device applies a neural network to the sets of coordinates in the three-dimensional space of the points of the subset of the first plurality of points to generate a semantic label.

In various implementations, the neural network includes an interconnected group of nodes. In various implementation, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value. In various implementations, the neural network is trained on training data to set the weights.

In various implementations, the neural network includes a deep learning neural network. Accordingly, in some implementations, the neural network includes a plurality of layers (of nodes) between an input layer (of nodes) and an output layer (of nodes). In various implementations, the neural network receives, as inputs, the sets of coordinates in the three-dimensional space of the points of the subset of the first plurality of points. In various implementations, the neural network provides, as an output, a semantic label for the subset.

As noted above, in various implementations, each point is associated with additional data. In various implementations, the additional data is also provided as an input to the neural network. For example, in various implementations, the color or color variation of each point of the subset is provided to the neural network. In various implementations, the confidence of each point of the cluster is provided to the neural network.

In various implementations, the neural network is trained for a variety of object types. For each object type, training data in the form of point clouds of objects of the object type is provided. More particularly, training data in the form of the sets of coordinates in the three-dimensional space of the points of point cloud are provided. Thus, the neural network is trained with many different point clouds of different tables to train the neural network to classify clusters as a "table". Similarly, the neural network is trained with many different point clouds of different chairs to train the neural network to classify clusters as a "chair".

In various implementations, the neural network includes a plurality of neural network detectors, each trained for a different object type. Each neural network detector, trained on point clouds of objects of the particular object type, provides, as an output, a probability that a particular subset corresponds to the particular object type in response to receiving the sets of coordinates in the three-dimensional space of the points of the particular subset. Thus, in response to receiving the sets of coordinates in the three-dimensional space of the points of a particular subset, a neural network detector for tables may output a 0.9, a neural network detector for chairs may output a 0.5, and a neural network detector for cylinders may output a 0.2. The semantic label is determined based on the greatest output.

In various implementations, the device determines multiple semantic labels for the subset. In various implementations, the device determines a series of hierarchical or layered semantic labels for the subset. For example, the device determines a number of semantic labels that identity the object represented by the subset with increasing degrees of specificity. For example, the device determines a first semantic label of "flat" for the subset indicating that the subset has one dimension substantially smaller than the other two. The device then determines a second semantic label of "horizontal" indicating that the flat subset is horizontal, e.g., like a floor or tabletop rather than vertical like a wall or picture. The device then determines a third semantic label of "floor" indicating that that the flat, horizontal subset is a floor rather than a table or ceiling. The device then determines a fourth semantic label of "carpet" indicating that the floor is carpeted rather than tile or hardwood floor.

In various implementations, the device determines sub-labels associated with sub-clusters of the particular subset. In various implementations, the method 1200 includes spatially disambiguating portions of the particular subset into a plurality of sub-clusters and determining a semantic sub-label based on the volumetric arrangement of the points of a particular sub-cluster of the subset. For example, in various implementations, the device determines a first semantic label of "table" for the subset. After spatially disambiguating the table subset include a plurality of sub-clusters, a first semantic sub-label of "tabletop" is determined for a first sub-cluster, whereas a second semantic sub-label of "leg" is determined for a second sub-cluster.

In various implementations, obtaining the second three-dimensional scene model includes determining the semantic label of the subset of the second plurality of points. In various implementations, the semantic label of the subset of the first plurality of points can also be used to semantically label the subset of the second plurality of points. For example, in various implementations, after (and/or in response to) associating the subset of the second plurality of points with the particular cluster identifier, the method 1200 includes associating the subset of the second plurality of points with a semantic label of the subset of the first plurality of points.

In various implementations, after (and/or in response to) associating the subset of the second plurality of points with the particular cluster identifier, the method 1200 includes adding particular points of the subset of the first plurality of points to the second three-dimensional scene model (e.g., as points of the subset of the second plurality of points). In various implementations, the particular points include points of the subset of the first plurality of points that are not the same or substantially similar to points of the subset of the second plurality of points.

In various implementations, at least one of the particular points is occluded during the second time period. For example, with respect to FIG. 11A, a point corresponding to a portion under the cylinder 104 during the second time period (but visible during the first time period) can be added to the second three-dimensional scene model as part of the subset of the second plurality of points.

These added particular points improve the completeness and accuracy of the second three-dimensional scene model and allow various XR experiences. For example, in various implementations, an XR application can be presented in which the representation of the cylinder 114 is made transparent, moved, or removed to reveal the table surface beneath (without changing any property of the real cylinder 104). Accordingly, in various implementations, the method 1200 includes displaying a representation of the physical environment during the second time period, wherein an occlusiveness of an object occluding the occluded at least one of the particular points is set such that at least one of the particular points is visible (e.g., the representation of the object is made more transparent, moved, or removed to reveal at least an additional portion of the representation of another object). As another example, in various implementations, an XR application can be presented in which a virtual camera is moved to a perspective in which the back of the representation of the cylinder 114 is displayed without moving the handheld electronic device 110 into the perspective. Accordingly, in various implementations, the method 1200 further includes displaying a representation of the physical environment during the second time period from a virtual camera perspective in which the occluded at least one of the particular points are visible.

In various implementations, after (and/or in response to) associating the subset of the second plurality of points with the particular cluster identifier, the method 1200 includes determining a camera pose of the scene camera based on subset of the second plurality of points. For example, if camera pose tracking is lost, the camera pose can be recovered using the sets of coordinates of the points of rigid and/or immovable elements (e.g., clusters with a semantic label of "wall" or "floor").

Figure 14:
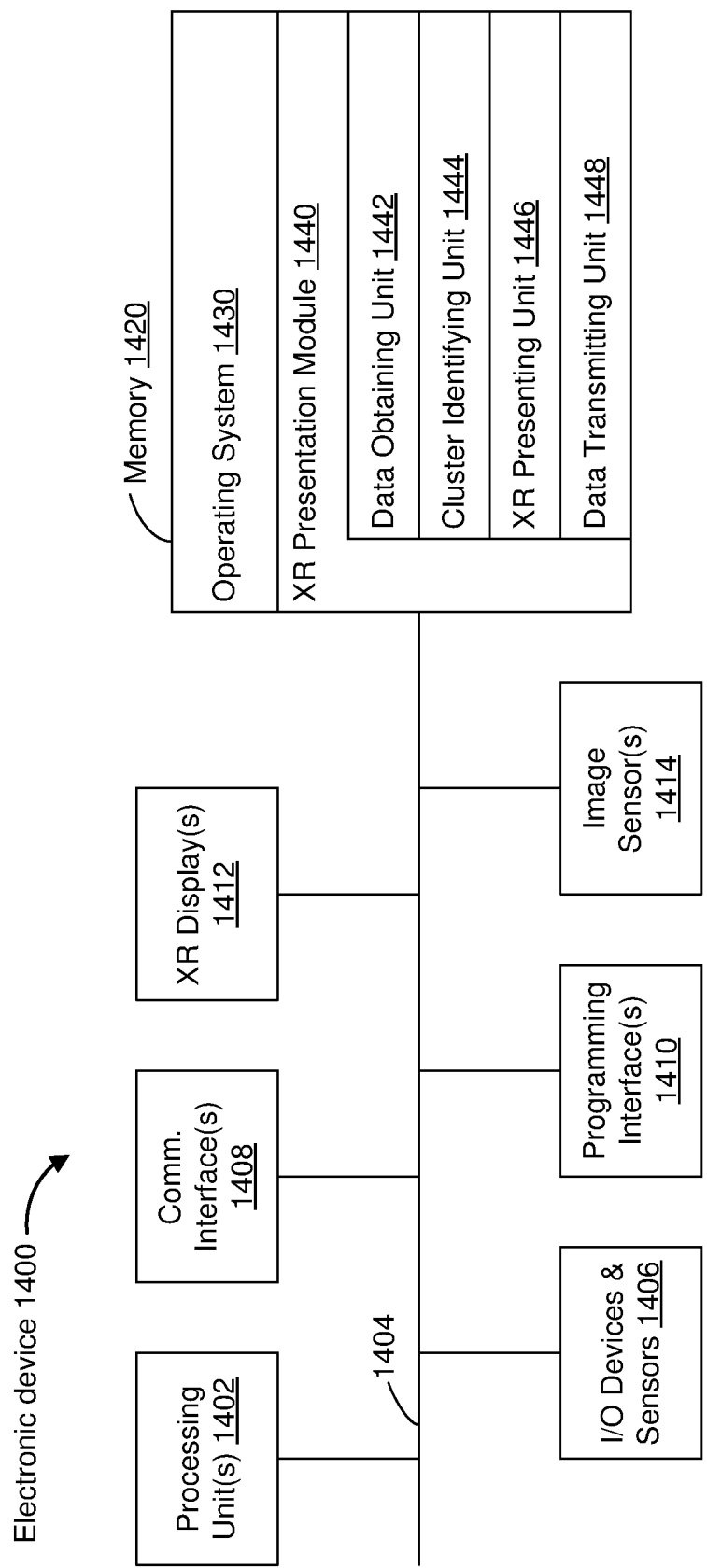
FIG. 14 is a block diagram of an electronic device in accordance with some implementations.

FIG. 14 is a block diagram of an electronic device 1400 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 1400 includes one or more processing units 1402 (e.g., microprocessors, ASICs, FPGAs, GPUs, CPUs, processing cores, and/or the like), one or more input/output (I/O) devices and sensors 1406, one or more communication interfaces 1408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1410, one or more XR displays 1412, one or more optional interior- and/or exterior-facing image sensors 1414, a memory 1420, and one or more communication buses 1404 for interconnecting these and various other components.

In some implementations, the one or more communication buses 1404 include circuitry that interconnects and controls communications between system components. In some implementations, the one or more I/O devices and sensors 1406 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 1412 are configured to present XR content to the user. In some implementations, the one or more XR displays 1412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 1412 correspond to diffractive, reflective, polarized, holographic, etc. waveguide displays. For example, the electronic device 1400 includes a single XR display. In another example, the electronic device 1400 includes an XR display for each eye of the user. In some implementations, the one or more XR displays 1412 are capable of presenting AR, MR, and/or VR content.

In various implementations, the one or more XR displays 1412 are video passthrough displays which display at least a portion of a physical environment as an image captured by a scene camera. In various implementations, the one or more XR displays 1412 are optical see-through displays which are at least partially transparent and pass light emitted by or reflected off the physical environment.

In some implementations, the one or more image sensors 1414 are configured to obtain image data that corresponds to at least a portion of the face of the user that includes the eyes of the user (any may be referred to as an eye-tracking camera). In some implementations, the one or more image sensors 1414 are configured to be forward-facing so as to obtain image data that corresponds to the physical environment as would be viewed by the user if the electronic device 1400 was not present (and may be referred to as a scene camera). The one or more optional image sensors 1414 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 1420 includes high-speed random-access memory, such as DRAM, SRAM, DDR RAM, or other random-access solid-state memory devices. In some implementations, the memory 1420 includes non-volatile memory, such as one or more magnetic disk storage devices, optical disk storage devices, flash memory devices, or other non-volatile solid-state storage devices. The memory 1420 optionally includes one or more storage devices remotely located from the one or more processing units 1402. The memory 1420 comprises a non-transitory computer readable storage medium. In some implementations, the memory 1420 or the non-transitory computer readable storage medium of the memory 1420 stores the following programs, modules and data structures, or a subset thereof including an optional operating system 1430 and an XR presentation module 1440.

The operating system 1430 includes procedures for handling various basic system services and for performing hardware dependent tasks. In some implementations, the XR presentation module 1440 is configured to present XR content to the user via the one or more XR displays 1412. To that end, in various implementations, the XR presentation module 1440 includes a data obtaining unit 1442, a cluster identifying unit 1444, an XR presenting unit 1446, and a data transmitting unit 1448.

In some implementations, the data obtaining unit 1442 is configured to obtain data (e.g., presentation data, interaction data, sensor data, location data, etc.). The data may be obtained from the one or more processing units 1402 or another electronic device. For example, in various implementations, the data obtaining unit 1442 obtains a three-dimensional scene model of a physical environment (including, in various implementations, a point cloud). To that end, in various implementations, the data obtaining unit 1442 includes instructions and/or logic therefor, and heuristics and metadata therefor.

In some implementations, the cluster identifying unit 1444 is configured to associate a subset of the points of a second three-dimensional scene model of the physical environment during a second time period with the cluster identifier of a subset of the points of the first three-dimensional scene model of the physical environment during a first time period. To that end, in various implementations, the cluster identifying unit 1444 includes instructions and/or logic therefor, and heuristics and metadata therefor.

In some implementations, the XR presenting unit 1446 is configured to present XR content via the one or more XR displays 1412. To that end, in various implementations, the XR presenting unit 1446 includes instructions and/or logic therefor, and heuristics and metadata therefor.

In some implementations, the data transmitting unit 1448 is configured to transmit data (e.g., presentation data, location data, etc.) to the one or more processing units 1402, the memory 1420, or another electronic device. To that end, in various implementations, the data transmitting unit 1448 includes instructions and/or logic therefor, and heuristics and metadata therefor.

Although the data obtaining unit 1442, the cluster identifying unit 1444, the XR presenting unit 1446, and the data transmitting unit 1448 are shown as residing on a single electronic device 1400, it should be understood that in other implementations, any combination of the data obtaining unit 1442, the cluster identifying unit 1444, the XR presenting unit 1446, and the data transmitting unit 1448 may be located in separate computing devices.

Moreover, FIG. 14 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 14 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at an electronic device including a processor and non-transitory memory:

obtaining a first three-dimensional scene model of a physical environment during a first time period including a first plurality of points, wherein each of the first plurality of points is associated with a set of coordinates in a three-dimensional space, wherein a subset of the first plurality of points corresponding to a first object at a first location in the physical environment is associated with a particular cluster identifier;

obtaining a second three-dimensional scene model of the physical environment during a second time period subsequent to the first time period including a second plurality of points, wherein each of the second plurality of points is associated with a set of coordinates in the three-dimensional space; and associating a subset of the second plurality of points corresponding to the first object at a second location in the physical environment different than the first location in the physical environment with the particular cluster identifier, wherein the subset of the second plurality of points includes points with different sets of coordinates in the three-dimensional space than the points of the subset of the first plurality of points,
wherein associating the subset of the second plurality of points with the particular cluster identifier is based on a comparison between (1) a spatial relationship between the subset of the second plurality of points and another subset of the second plurality of points corresponding to a second object and (2) a spatial relationship between the subset of the first plurality of points and another subset of the first plurality of points corresponding to the second object.

2. The method of claim 1, wherein associating the subset of the second plurality of points with the particular cluster identifier is based on an amount of the second plurality of points having substantially similar sets of coordinates in the three-dimensional space to the sets of coordinates in the three-dimensional space of the subset of the first plurality of points.

3. The method of claim 1, wherein associating the subset of the second plurality of points with the particular cluster identifier is based on a spatial relationship between the subset of the second plurality of points and the subset of the first plurality of points.

4. The method of claim 3, wherein associating the subset of the second plurality of points with the particular cluster identifier is based on a distance between the subset of the second plurality of points and the subset of the first plurality of points.

5. The method of claim 1, wherein associating the subset of the second plurality of points with the particular cluster identifier is based on an amount of time between the first time period and the second time period.

6. The method of claim 1, wherein associating the subset of the second plurality of points with the particular cluster identifier is based on a semantic label of the subset of the first plurality of points.

7. The method of claim 1, wherein the subset of the first plurality of points is further associated with a first semantic label and the second subset of the second plurality of points is further associated with a second semantic label, wherein associating the subset of the second plurality of points with the particular cluster identifier is based on a comparison between the first semantic label and the second semantic label.

8. The method of claim 1, further comprising associating the subset of the second plurality of points with a semantic label of the subset of the first plurality of points.

9. The method of claim 1, wherein the first three-dimensional scene model includes the first plurality of points as vertices of one or more mesh-based object models, wherein the one or more mesh-based object models include one or more edges between the vertices.

10. The method of claim 1, wherein obtaining a second three-dimensional scene model includes adding and/or removing points from the first three-dimensional scene model.

11. The method of claim 1, further comprising adding particular points of the subset of the first plurality of points to the second three-dimensional scene model.

12. The method of claim 11, wherein at least one of the particular points is occluded during the second time period.

13. The method of claim 12, further comprising:
displaying a representation of the physical environment during the second time period, wherein an occlusiveness of an object occluding the occluded at least one of the particular points is set such that at least one of the particular points is visible.

14. The method of claim 12, further comprising:
displaying a representation of the physical environment during the second time period from a virtual camera perspective in which the occluded at least one of the particular points are visible.

15. A device comprising:
a non-transitory memory; and
one or more processors to:
obtain a first three-dimensional scene model of a physical environment during a first time period including a first plurality of points, wherein each of the first plurality of points is associated with a set of coordinates in a three-dimensional space, wherein a subset of the first plurality of points corresponding to a first object at a first location in the physical environment is associated with a particular cluster identifier;
obtain a second three-dimensional scene model of the physical environment during a second time period subsequent to the first time period including a second plurality of points, wherein each of the second plurality of points is associated with a set of coordinates in the three-dimensional space; and
associate a subset of the second plurality of points corresponding to the first object at a second location in the physical environment different than the first location in the physical environment with the particular cluster identifier, wherein the subset of the second plurality of points includes points with different sets of coordinates in the three-dimensional space than the points of the subset of the first plurality of points,
wherein the one or more processors are to associate the subset of the second plurality of points with the particular cluster identifier based on a comparison between (1) a spatial relationship between the subset of the second plurality of points and another subset of the second plurality of points corresponding to a second object and (2) a spatial relationship between the subset of the first plurality of points and another subset of the first plurality of points corresponding to the second object.

16. The device of claim 15, wherein the one or more processors are to associate the subset of the second plurality of points with the particular cluster identifier based on an amount of the second plurality of points having substantially similar sets of coordinates in the three-dimensional space to the sets of coordinates in the three-dimensional space of the subset of the first plurality of points.

17. The device of claim 15, wherein the one or more processors are to associate the subset of the second plurality of points with the particular cluster identifier based on an amount of time between the first time period and the second time period.

18. The device of claim 15, wherein the one or more processors are to associate the subset of the second plurality of points with the particular cluster identifier based on a semantic label of the subset of the first plurality of points.

19. A non-transitory memory storing one or more programs, which, when executed by one or more processors of a device, cause the device to:
obtain a first three-dimensional scene model of a physical environment during a first time period including a first plurality of points, wherein each of the first plurality of points is associated with a set of coordinates in a three-dimensional space, wherein a subset of the first plurality of points corresponding to a first object at a first location in the physical environment is associated with a particular cluster identifier;

obtain a second three-dimensional scene model of the physical environment during a second time period subsequent to the first time period including a second plurality of points, wherein each of the second plurality of points is associated with a set of coordinates in the three-dimensional space; and associate a subset of the second plurality of points corresponding to the first object at a second location in the physical environment different than the first location in the physical environment with the particular cluster identifier, wherein the subset of the second plurality of points includes points with different sets of coordinates in the three-dimensional space than the points of the subset of the first plurality of points, wherein the one or more programs, when executed by the one or more processors of the device, cause the device to associate the subset of the second plurality of points with the particular cluster identifier based on a comparison between (1) a spatial relationship between the subset of the second plurality of points and another subset of the second plurality of points corresponding to a second object and (2) a spatial relationship between the subset of the first plurality of points and another subset of the first plurality of points corresponding to the second object.

* * * * *